March 17, 1970  G. OBERPICHLER  3,500,706
HYDRAULIC CONTROL DEVICE FOR AN AUTOMATIC
MOTOR VEHICLE CHANGE-SPEED GEAR
Filed Feb. 8, 1968
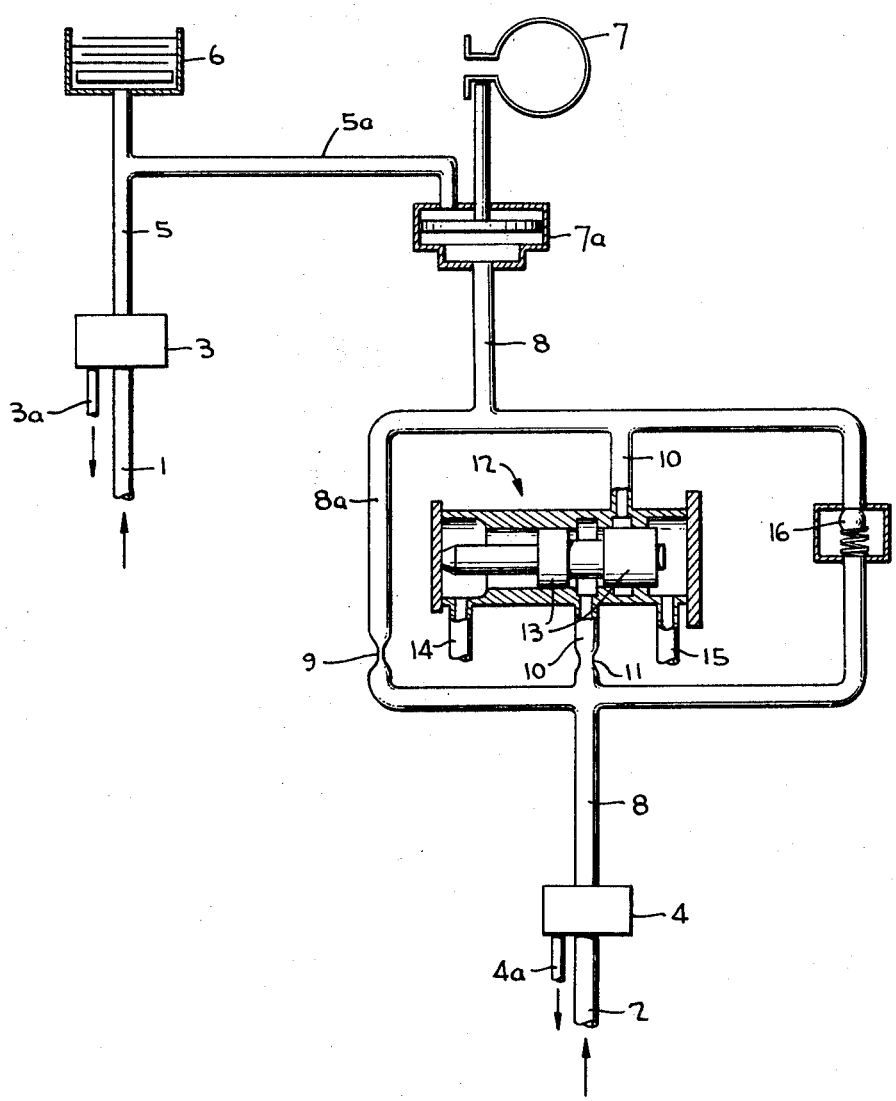
INVENTOR,
GERD OBERPICHLER
BY
Watson, Cole, Grindle & Watson
ATTORNEYS

United States Patent Office 3,500,706
Patented Mar. 17, 1970

3,500,706
HYDRAULIC CONTROL DEVICE FOR AN AUTOMATIC MOTOR VEHICLE CHANGE-SPEED GEAR
Gerd Oberpichler, 52 Oldenburgstrasse, 33 Braunschweig, Germany
Filed Feb. 8, 1968, Ser. No. 704,107
Claims priority, application Germany, Feb. 17, 1967, 1,655,587
Int. Cl. B60k 19/00
U.S. Cl. 74—868
2 Claims

ABSTRACT OF THE DISCLOSURE

A hydraulic control device for a motor vehicle change-speed gear having a piston valve in a fluid pressure system which is connected in the system to be responsive to effective speed change.

---

The present application relates to a hydraulic control system for an automatic change-speed gear for a motor vehicle.

The invention concerns a hydraulic control device for an automatic vehicle change-speed gear by which a shifting pause, which can be varied with simple means with the speed of travel, between the operation of the two shifting elements of the drive which are effective in the case of a change down, and actually in such a manner that in the case of a high speed of travel, a restrictor of a smaller cross section is shifted into the operating pressure line of a second shifting element than in the case of low speeds of travel. In this case the motor will be able, after releasing the first shifting element, for instance a clutch, to turn up freely, before the second shifting element, for example a band brake, is tightened. The invention comprises a control valve which is acted upon by a pressure that is dependent upon the speed of travel, the valve serving for the selective switching-in of one of two restrictors of different size in the pressure line to the second shifting element. According to the invention, by the way of example, the force of hydraulic pressure is to counteract the force acting upon the piston of the control valve caused by the pressure which is dependent on the speed of travel.

The one-sided dependence of the control of the shifting valve on the speed of travel is not the best. In the case of low speeds of travel and little gas, by way of example, the restrictor with a large cross section would be engaged and correspondingly there would be a small delaying period between the times that the two shifting elements become active when a longer delaying time would be more advantageous. Correspondingly and according to the invention, it is an object thereof, to expose said piston unilaterally to a pressure depending on the load condition of the engine. In the case of low speeds of travel and little gas or of idle gear, the force of the piston depending on the speed of travel will then be preponderant and will force an engagement of the restrictor with a small cross section. In the upper gas area and low speeds of travel, on the other hand, the counterforce will be preponderant and will, as it did hitherto, operate so that the restrictor with the large cross section is engaged.

Further objects of the invention will be apparent from the following description when considered in connection with the accompanying drawing which is a diagrammatic view of the system according to the invention.

On the drawing, the hydraulic shifting device of the control device for an automatic, a hydrodynamic change-speed gear or torque converter transmission has been shown by way of a segment only to the point required for an understanding of the invention.

A main pressure dependent on the load of the motor is fed in through lines or tubes 1 and 2. This pressure is created in a known manner, not shown, with the aid of a main pressure valve, which in turn is controlled by a control pressure dependent on the underpressure (vacuum) of the suction pipe of the motor.

The main pressure can be fed to the individual shifting elements by way of sleeve valves or shifting valves, which in a known manner is provided on the basis of the load of the motor, for example, on the basis of the underpressure in the suction pipe and in dependence on the speed of travel, for example according to a centrifugal governor. In the drawing merely those shifting elements are shown which will begin to function during the shifting procedure from the second to the third speed and vice versa, and the pertinent shifting valves as well as the special means according to the invention.

Pressure line 5 leads from the slide valve 3 to a hydraulically shiftable friction clutch 6 and a feed line 5a leads to the disengagement side of the control cylinder 7a of a hydraulic band brake 7. The pressure line 8 leads from the valve 4 to the contact side of the control cylinder 7a. The construction and method of operation of the slide valves 3 and 4 need not be described in all their details for an understanding of the present invention, since it will suffice to say that the valve 3 passes on the main pressure when the third speed is engaged and that it blocks in the case of an engaged second speed, while the valve 4 will block the main pressure in the first speed and passes it on in the second and in the third speeds. In the case of blocked valves 3 and 4, the pistons are relieved of clutch 6 and brake 7 is relieved of pressure, by the fact that pressure oil in the shifting elements 6 and 7a can flow off by means of the lines 3a and 4a.

The clutch 6 is disengaged in the second speed and the brake 7 is tightened. In the third speed, conditions are the reverse. In the case of a shifting from the third speed to the second speed, the clutch 6 is immediately relieved of pressure, valve 3, and is instantaneously disengaged. The pressure supply to the contact side of the control cylinder 7a of the brake 7, valve 4, takes place however by a restrictor, so that the motor will be able to turn up freely for a certain time before the brake band grips. This shifting device now is no longer to be dependent only on the speed of travel but it is also supposed to be dependent on the state of the load of the motor. For this purpose a valve 12 has been provided, whose piston 13 is exposed unilaterally to the pressure fed in at 15 of a centrifugal governor, not shown, and, on the other hand, to the pressure fed in at 14 of a control arrangement, which likewise has not been shown, and is dependent on the load condition of the motor.

The piston 13 of the valve 12 opens and closes the inflow of the pressure agent through the line 10 with a wide restrictor or large nozzle 11, which is connected in parallel to a line 8a with a narrow restrictor 9.

In the case of quick shifts, which take place in the case of fairly high speeds of travel with full travel, and in the case of zero gas shifts with a low speed of travel, the centrifugal control pressure predominates and holds the piston against the left hand stop of the valve 12. The pressure line 8 from the slide valve 4 is connected only by a small nozzle 9 with a line leading to the contact side of the brake 7.

Therefore, in the case of a quick down shift, the brake 7 will grasp with considerable delay after releasing the clutch 6, only whenever the motor has freely accelerated to its new r.p.m. and the drum of the clutch, as a result thereof, has about come to a standstill. In the case of zero gas shifts, the brake 7 makes a soft contact as a result of the throttling of the inflow, so that the engine is forced gradually to its new r.p.m.

In the case of down shifting, reverse shifting which is accomplished with gas in the case of medium r.p.m.'s, the pressure dependent on the load will be predominant on the piston 13 and pushes the latter to the right hand stop of the valve 12 and connects the pressure line 8 from the slide valve 4 with a contact side of the brake 7 additionally by the large nozzle 11. The delay of the contact of brake 7 as compared to the disengagement of the clutch 6 is now small, corresponding to the shorter time requirement for acceleration of the engine in the case of medium r.p.m.'s.

In the case of the contact of the brake 7 engaging of the second speed, the ball valve 16, switched in parallel with the small nozzle 9, is always closed. When shifting into the third speed, this valve 16 is opened and allows oil to flow off without being throttled from the contact side of the brake 7, so that the brake will disengage quickly.

I claim:
1. A hydraulic control device for a motor vehicle change-speed gear comprising a valve for the selective shifting of one of two restrictors of varying size in a pressure line to a second shifting element, said valve being arranged in the operating pressure line and shiftable effective in the case of down shifting of a speed in second position and exposed unilaterally to a pressure depending on the speed of travel, and a piston in the valve exposed unilaterally to a pressure dependent on the load condition of the engine.

2. A hydraulic control device according to claim 1, in which the valve is a slide valve adjustable by the operating pressure.

References Cited

UNITED STATES PATENTS

| | | | |
|---|---|---|---|
| 3,004,447 | 10/1961 | Sand | 74—868 |
| 3,383,956 | 5/1968 | Chana | 74—868 |
| 3,394,622 | 7/1968 | Chana | 74—867 |

ARTHUR T. McKEON, Primary Examiner